(12) United States Patent
Murphy et al.

(10) Patent No.: US 6,994,142 B2
(45) Date of Patent: Feb. 7, 2006

(54) LAMINATING MACHINE (76) Inventors: Willis A. Murphy, 28 Hemlock Ter., Deep River, CT (US) 06417; Michael R. Carsten, 29 Breeze La., Branford, CT (US) 06405

(*) Notice: Subject to any disclaimer, the term of this patent is extended or adjusted under 35 U.S.C. 154(b) by 0 days.

(21) Appl. No.: 10/842,655

(22) Filed: May 10, 2004

(65) Prior Publication Data

US 2005/0247405 A1    Nov. 10, 2005

(51) Int. Cl.
*B32B 31/20*    (2006.01)

(52) U.S. Cl. .................. 156/359; 156/555; 156/582

(58) Field of Classification Search ............... 156/358, 156/359, 362, 363, 364, 555, 562, 582, 583.1
See application file for complete search history.

(56) References Cited

U.S. PATENT DOCUMENTS

| | | | |
|---|---|---|---|
| 2,335,485 A | 11/1943 | Ettl | |
| 2,352,194 A | 6/1944 | Grabic | |
| 2,414,572 A | 1/1947 | Von Der Heide | |
| 2,542,901 A | 2/1951 | Chaffee | |
| 3,340,130 A | 9/1967 | Dunn et al. | |
| 3,711,355 A | 1/1973 | Staats et al. | |
| 3,901,758 A | 8/1975 | Humphries | |
| 4,116,749 A | 9/1978 | Dufort et al. | |
| 4,139,600 A | 2/1979 | Rollmann et al. | .......... 423/703 |
| 4,172,750 A | 10/1979 | Giulie | |
| 4,387,000 A | 6/1983 | Tancredi | |
| 4,420,680 A | 12/1983 | Itoh | |
| 4,451,320 A | 5/1984 | Marvel | |
| 4,743,334 A | 5/1988 | Singer | |
| 4,859,274 A | 8/1989 | Marvel | |
| 5,139,600 A | 8/1992 | Singer | |
| 5,158,641 A | 10/1992 | Vermeulen et al. | |
| 5,356,507 A | 10/1994 | Wojtanowitsch et al. | |
| 5,728,257 A | 3/1998 | Lee | |
| 5,735,997 A | 4/1998 | Reinders | |
| 5,746,878 A | 5/1998 | Kuhns et al. | |
| 5,772,841 A | 6/1998 | Lindsay | |
| 5,810,965 A * | 9/1998 | Fwu | ........................... 156/359 |
| 5,853,531 A | 12/1998 | Murphy et al. | |
| 6,131,636 A | 10/2000 | Anderson et al. | |
| 6,179,952 B1 | 1/2001 | Spranger | |
| 2003/0131931 A1 | 7/2003 | Murphy | .................... 156/272.2 |
| 2003/0180062 A1 * | 9/2003 | Suzuki | ......................... 399/33 |

* cited by examiner

*Primary Examiner*—George Koch
(74) *Attorney, Agent, or Firm*—Barnes & Thornburg LLP (57) ABSTRACT

A laminator for laminating a document in at least one of a laminating pouch and on a substrate comprising upper, middle and lower rolls, the upper and middle rolls defining a first nip for laminating a document between first and second sheets of laminating film, the middle and lower rolls defining a second nip for laminating a document beneath a film on a substrate, means for driving one of the upper and middle rolls, a first drive means for connecting the upper and middle rolls, a second drive means for connecting the upper and lower rolls whereby the lower and upper rolls rotate in the same direction, means defining a first path on one side of the rolls for inserting a laminating pouch between the upper and middle rolls, and a means defining a second path on the other side of the rolls for inserting the substrate between the middle and lower rolls from the other side of the rolls.

22 Claims, 8 Drawing Sheets

LAMINATING MACHINE

FIELD OF THE INVENTION

This invention relates to plastic laminating machines and laminating machines which have a new capability of laminating documents, including photographs, to thick substrates such as foam board.

BACKGROUND OF THE INVENTION

Pouch laminating machines as well as roll feed laminating machines for documents are well known. The pouch machines generally comprise a pair of heated platens through which a document enclosed in the pouch is passed between drive rolls to the platens. The pouch is generally a folded over plastic material having thermal properties and adhesives thereon which will bond the plastic to the document to be protected and also the edges of the plastic sheets to each other. The pouch may be within a holder or carrier which is suitably coated to receive any overflow of adhesive material from the pouch and prevent such adhesive material from being deposited on the drive rolls.

Such laminating machines are limited in the thickness of material which may be laminated.

One laminating machine marketed by USI, Inc. of Madison, Conn. provides the ability to accept materials of slightly greater thickness than normal by permitting a small increase in separation of the entrance and exit rolls which does not exceed a dimension which would cause separation of the drive gearing.

This machine comprises a first set of entrance rolls and a second set of exit rolls on either side of upper and lower heating platens. One roll is driven by an electric motor, through gears on the shafts of the rolls and an idler gear, and the first and second sets of rolls are synchronized. The upper rolls of the first and second sets are journaled in somewhat flexible arms which permit acceptance of materials of a small variation in thickness. However, such variation is limited by the gear teeth. If the gearing between the rolls of each set separates, feed of the material is lost.

Other examples of prior art laminating machines are shown in U.S. Pat. Nos. 2,542,901, 3,340,130, 3,711,355, 4,116,749, 4,172,750 and 4, 451,320.

The prior art devices discussed above and shown by the aforementioned patents are not suitable for accepting documents of varying thickness, particularly when a thick backing such as foam board is used as a substrate.

Accordingly, a new and improved laminating machine is desirable for laminating a wide range of thickness of documents which is of new and improved construction.

Accordingly, a new and improved laminating machine is desirable in which the upper roll may move upwardly to provide clearance for thick material and auxiliary drive means are provided for driving all rolls in synchronization when the gearing of the rolls of a set of rolls move out of mesh due to the thickness of the material or a substrate therefore.

A laminating machine of the pouch or roll type is also desirable in which at least one roll of a pair of rolls is driven in synchronism by a power transmission means from a directly driven roll. The power transmission means bias the upper roll downwardly while permitting the upper roll to move upwardly to accept materials of varying thickness in a nip defined between the pair of rolls.

An aspect of this invention is to provide a laminating machine for laminating a wide range of thickness of documents which is of new and improved construction.

Another aspect of this invention is to provide a laminating machine for laminating documents within plastic which provides a new and improved structure for accepting documents of varying thickness, and documents on thick substrates.

BRIEF SUMMARY OF THE INVENTION

The above discussed and other drawbacks and deficiencies are overcome or alleviated by a laminator for laminating a document in a laminating pouch and/or a substrate comprising: a first roll heated along a length thereof; a third roll; a second roll heated along a length thereof and intermediate the first and third rolls; a first nip defining a first distance between the first and second rolls, the first nip configured to laminate a document between first and second sheets of laminating film; a second nip defining a second distance between the second and third rolls, the second nip configured to laminate the document intermediate a film and a substrate; a first drive means for driving one of the first and second rolls; a second drive means for connecting the first and second rolls, wherein the first and third rolls are operably connected to rotate in a same direction; a first means defining a first path on one side of the first, second, and third rolls, the first means for inserting a laminating pouch between the first and second rolls; and a second means defining a second path on an opposite side of the one side of the first, second, and third rolls, the second means for inserting the substrate between the second and third rolls from the opposite side of the first, second, and third rolls.

In another embodiment, a laminating machine of the type which laminates documents between sheets of plastic or on a substrate is disclosed. The laminating machine includes: a housing; a first roll having a first end shaft defining ends thereof, the first roll being heated along a length thereof; a third roll; a second roll, the second roll being heated along a length thereof and intermediate the first and third rolls, the first, second, and third rolls are disposed within the housing having end shafts, the first and second rolls are arranged for pouch laminating while the second and third rolls are arranged for board laminating; spaced apart end supports in the housing rotatably supporting the end shafts, the first and third rolls mounted in the end supports to move away from the second roll to accommodate material of variable thickness; a first drive means operably connected to one of the first and second rolls to drive the first and second rolls in synchronizing rotation; a second drive means operably connecting the first and third rolls to rotate in a same direction and to bias the third roll toward the second roll while permitting the third roll to move away from the second roll to an extent dependent on the thickness of material passing between the second and third rolls.

The above discussed and other features and advantages of the present invention will be appreciated and understood by those skilled in the art from the following detailed description and drawings.

BRIEF DESCRIPTION OF THE DRAWINGS

Referring to the exemplary drawings wherein like elements are numbered alike in the several Figures.

DETAILED DESCRIPTION OF THE INVENTION

Figure 1:
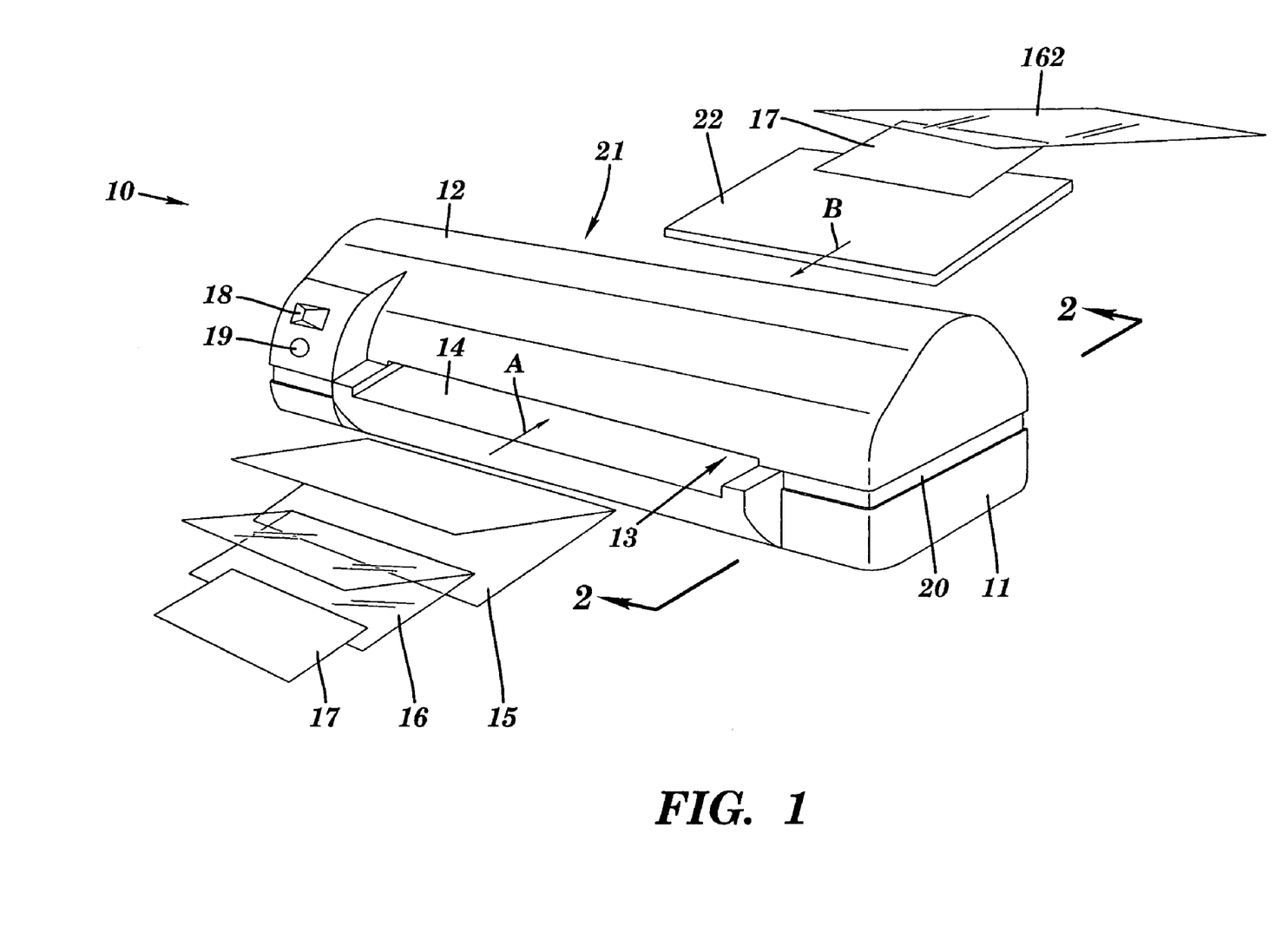
FIG. 1 is a view in perspective of a device embodying the invention.

Reference is now made to FIG. 1 which discloses a pouch laminating machine 10 embodying an exemplary embodiment in accordance with the present invention which has a lower housing member 11 and an upper housing member 12 which is adapted to receive a document to be laminated through an entrance way 13 in the direction of arrow A. The document to be laminated is inserted into a first feed slot or first entrance 13 for an upper nip via a platform 14.

As is conventional with pouch laminating machines a carrier 15 is provided which generally has a waxed or otherwise coated surface to accept any overflow of adhesive from a pouch 16 in which a document 17 to be laminated is included. The pouch or packet 16 will be coated with a heat sensitive adhesive which will seal the document 17 therein. Thereafter, depending upon the size of the document, the pouch 16 may be cut or trimmed for an acceptable size.

The laminating machine thus far described is of a type referred to as a pouch laminator.

Laminating machine 10 further includes a second feed slot or second entrance 21 for a lower nip opposite first entrance 13 configured to receive a document to be laminated to a substrate 22. Substrate 22 in one embodiment is a foam board having only one sheet of heat and pressure sensitive plastic 16a laminated to one side thereof sealing the document 17 therebetween. Thereafter, depending upon the size of the document, the laminated plastic and/or the substrate 22 may be cut or trimmed for an acceptable size.

The invention may also be embodied in what is referred to as a roll laminator wherein the laminating machine includes plastic on one or more rolls which are fed into the machine over a heating shoe(s) or roller(s) whereby adhesive substance on the plastic is heated to a bonding temperature. In such roll laminators the pouch 16 or carrier 15 are not required. The material to be protected is laminated between the plastic sheet material fed into the machine from the rolls, or on to a substrate if only one surface need be protected. The invention as applied to a roll laminating machine is hereinafter described.

As shown in FIG. 1, the first entrance way 13 is in the direction of arrow A for acceptance of the carrier 15 with the pouch 16 and document 17 therein, while second entrance way 21 for acceptance of substrate 22 with laminating plastic 16a and document 17 therebetween is in an opposite direction indicated with arrow B. Also as shown in FIG. 1, there may be an OFF and ON switch 18 and also an indicating lamp 19 to indicate that the machine is ready for operation. In an exemplary embodiment, OFF and ON switch 18 includes a potentiometer incorporated therewith to vary a heating temperature discussed more fully herein.

The upper housing member 12 may be designed to at least telescopically fit over the lower housing member 11. Depending upon design esthetics, a band 20 may be displayed or evidenced between the lower and upper housing members 11 and 12.

The lower and upper housing members 11 and 12, respectively, define opening 13 for insertion of the carrier 15 with the pouch or packet 16 and document 17 to be laminated for receipt therein. The lower and upper housing members 11 and 12, respectively, define opening 21 opposite and not aligned (i.e., non-planar) with opening 13 for insertion of the substrate 22 with the laminating plastic 16a and document 17 to be laminated for receipt therein.

A laminator embodying the invention may also accept other types of sheets to be laminated. For example, a document or photograph may be placed over a dry mount tissue on thick foam board or other substrate and passed through the laminator. In such case the carrier 15 may or may not be used. Furthermore, the opening 13, 21 in which the document passes depends on the overall thickness of the packet being passed through the laminator. Thicker packets are passed through opening 21, while thinner packets are passed through opening 13.

Figure 2:
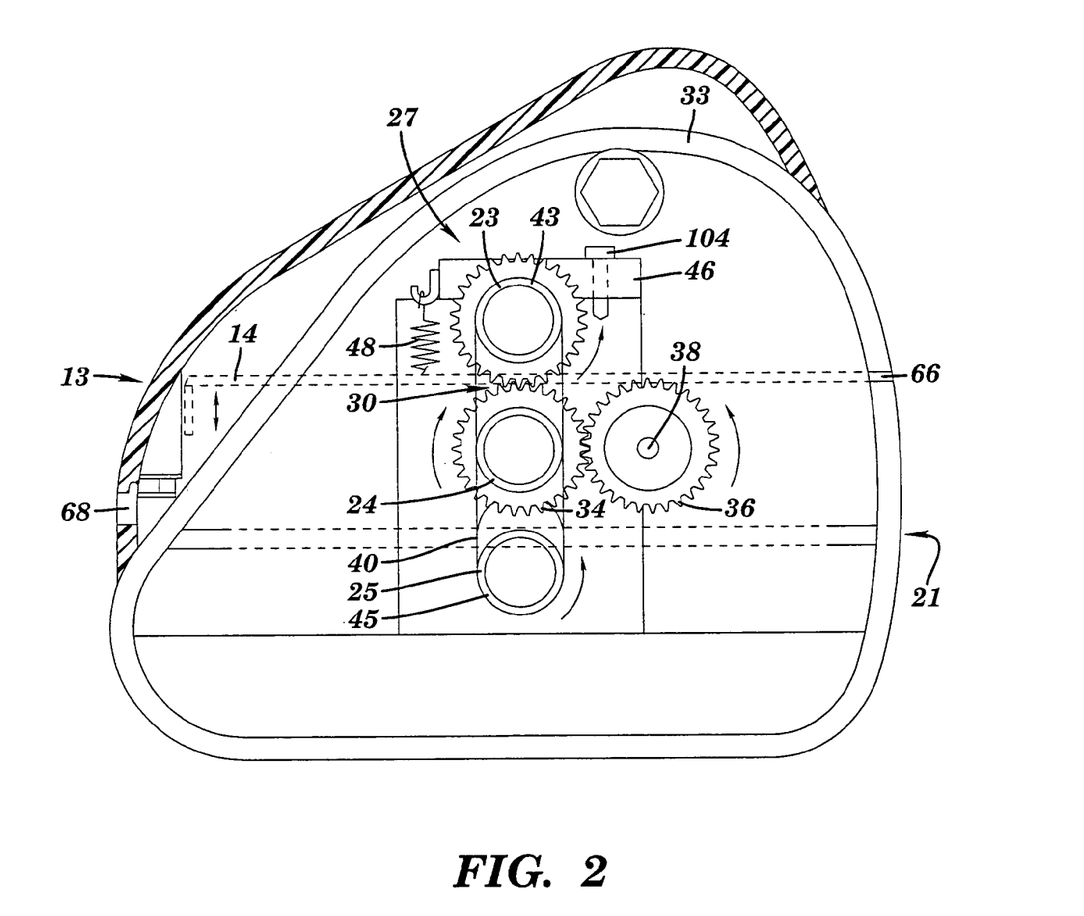
FIG. 2 is a sectional view seen in the plane of lines 2—2 of FIG. 1.
Figure 3:
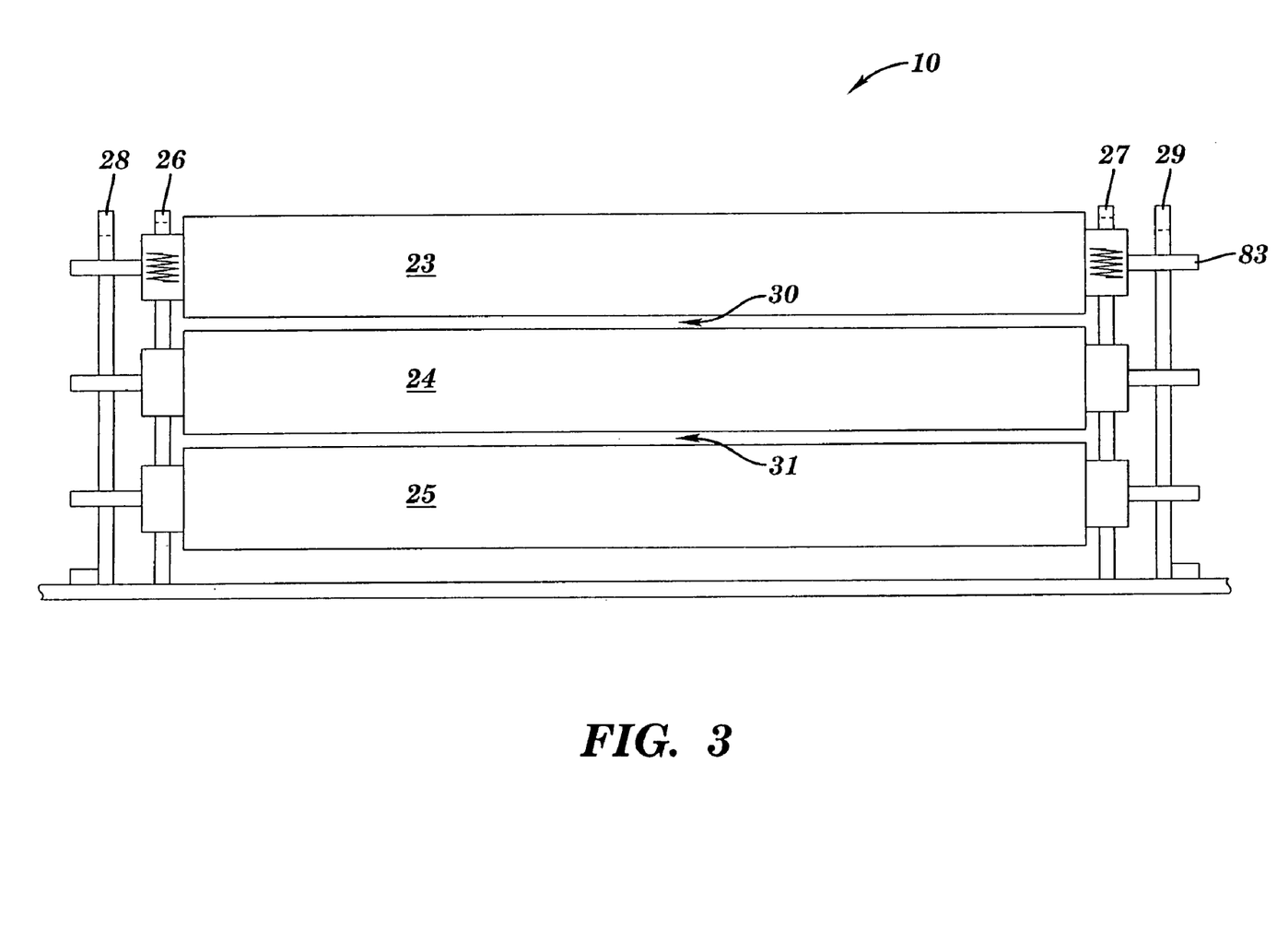
FIG. 3 is a front elevation view of the device of FIG. 1, with a housing removed.

Reference is now made to FIGS. 2 and 3. FIG. 2 is a sectional view seen along the plane of lines 2—2 of FIG. 1 and exemplifies the interior of the laminating machine 10. FIG. 3 is a schematic front elevation view of FIG. 1 with the housing removed. FIG. 2 does not show all of the elements which might be seen in the plane of lines 2—2 of FIG. 1 for clarity of illustration and purposes of description, but is presented to show the path presented by each of the entrances 13 and 21 and heated rolls 23 and 24, as well as a lower roll 25 disposed relative to roll 23 having roll 24 therebetween.

The upper and middle rolls or heated rolls 23 and 24, respectively, in addition to the lower roll 25 are journaled in end supports 26 and 27 (only one side 27 shown in FIG. 2). The upper and middle rolls are hollow such that heaters 28 and 29 extend between supports 28 and 29, and heat rolls 23 and 24 separately. Rolls 23 and 24 define a first nip 30. Nip 30 is configured to receive a laminating pouch and provide heat and pressure to laminate document 17 within pouch 16 when it is inserted in opening 13. Lower roll 25 and middle roll 24 define a second nip 31. Second nip 31 is wider than first nip 30 and is configured to receive substrate 22 or thick foam board of about one-quarter inch.

Still referring to FIGS. 2 and 3, a motor shown generally at 33 drives a gear 34 coaxially disposed with roll 24 via a drive gear 36 extending from motor 33 via a drive shaft 38. Roll 24 is geared to roll 23 and both rotate so as to feed a pouch from left to right as seen in FIG. 2 or in direction A (FIG. 1). A biasing power transmission means 40 is operably connected between rolls 23 and 25. In an exemplary embodiment, biasing power transmission means 40 includes a belt or an O-ring 40 disposed on pulleys 43 and 45 disposed on either ends of shafts of rolls 23 and 25, respectively.

Figure 4:
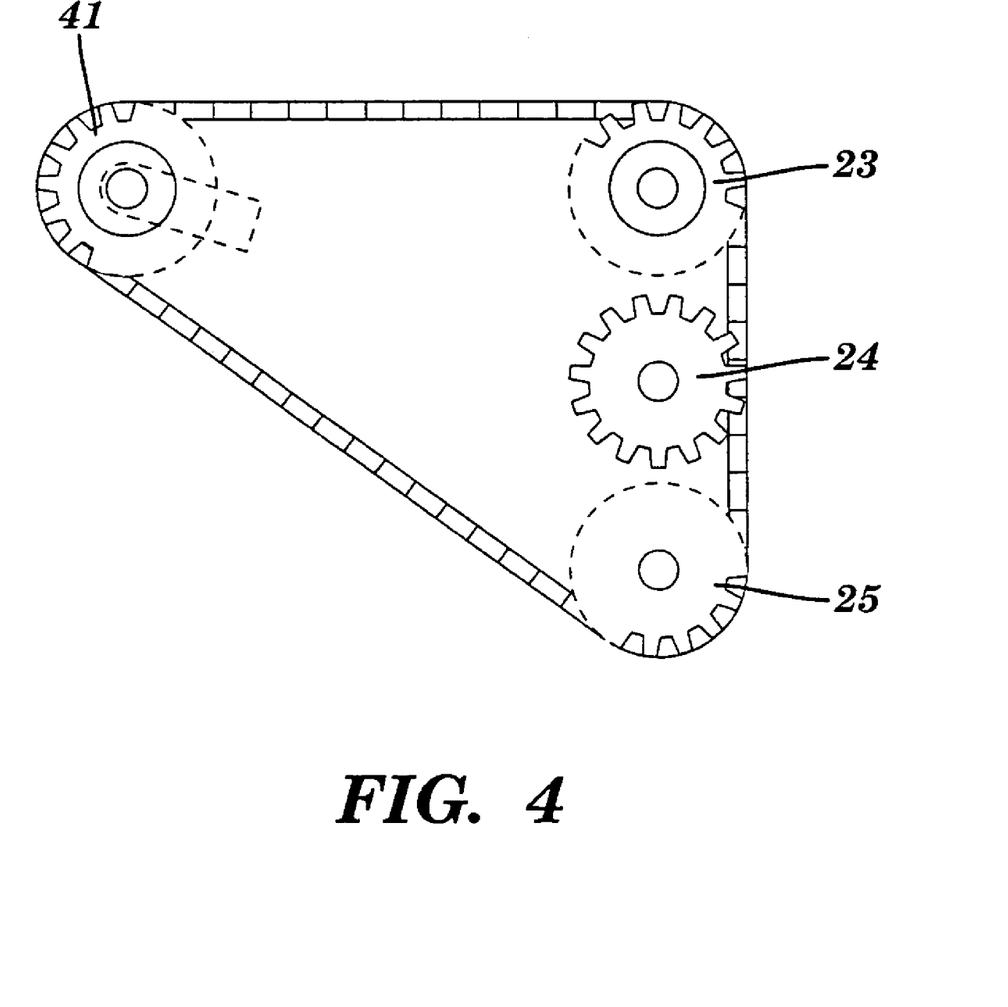
FIG. 4 is a sectional view as in FIG. 2 illustrating an alternative embodiment of a biasing power transmission means encompassed in a biased idler and drive chain.

In an alternative embodiment with reference to FIG. 4, it is contemplated that biasing power transmission means includes a nonresilient chain drive, wherein a biased idler 41 is utilized to allow roll 25 downward displacement while allowing roll 23 upward displacement from middle roll 24 discussed more fully below.

Accordingly, geared transmission of middle roll 24 with upper roll 23 which in turn rotates lower roll 25 via O-ring 40 to provide feed from in through entrance 21 from right to left as seen in FIG. 2 or direction B (FIG. 1). Feed in through entrance 21 allows foam board backing between rolls 24 and 25 for lamination thereon. It will be recognized by one skilled in the pertinent art that only one side of the foam board backing or substrate 22 is laminated and therefore it is not necessary to heat roll 25.

A bearing for roll 23 is split indicated generally at 46 to permit upward movement of roll 23. A spring 48 is operably attached to an upper split bearing 46 disposed at opposing ends to bias roll 23 toward roll 24 as best seen in FIGS. 5–7.

Figure 5:
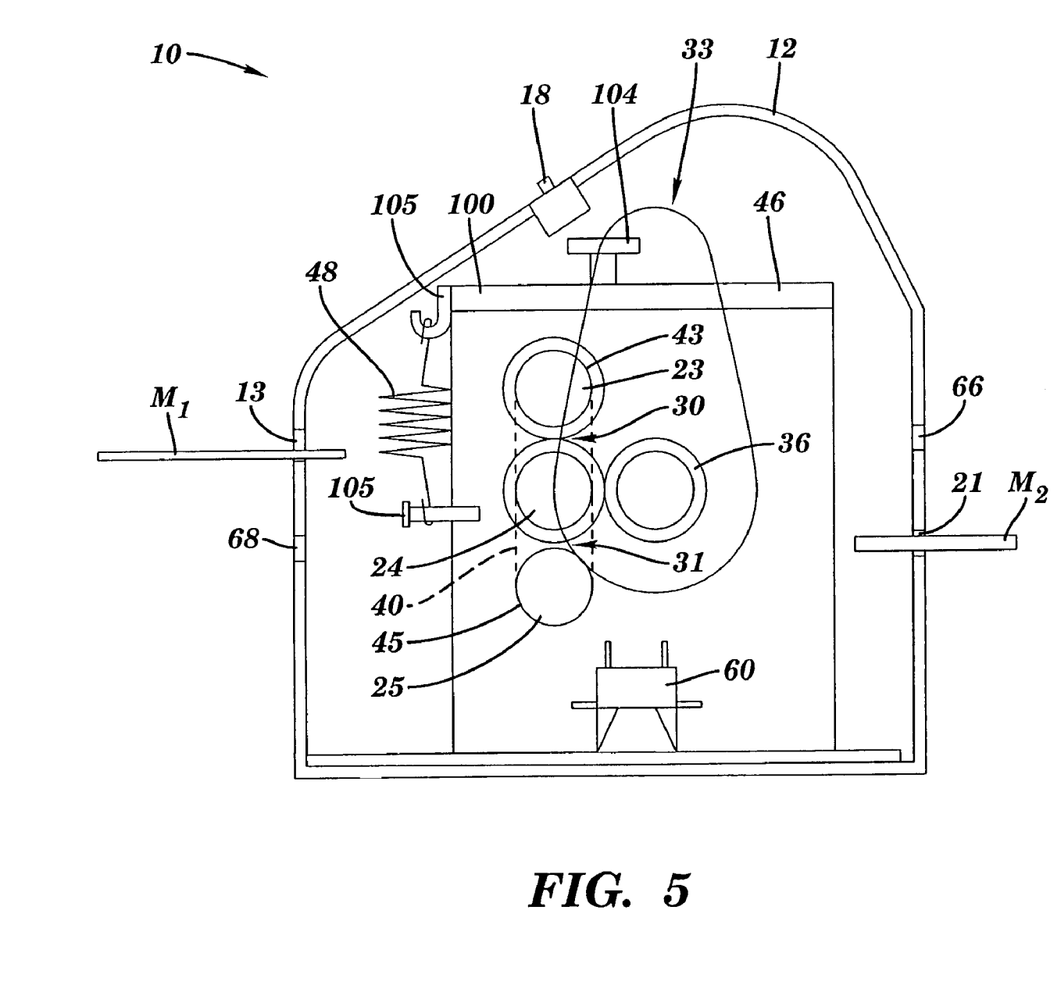
FIG. 5 is a different and more detailed sectional view of FIG. 1.
Figure 6:
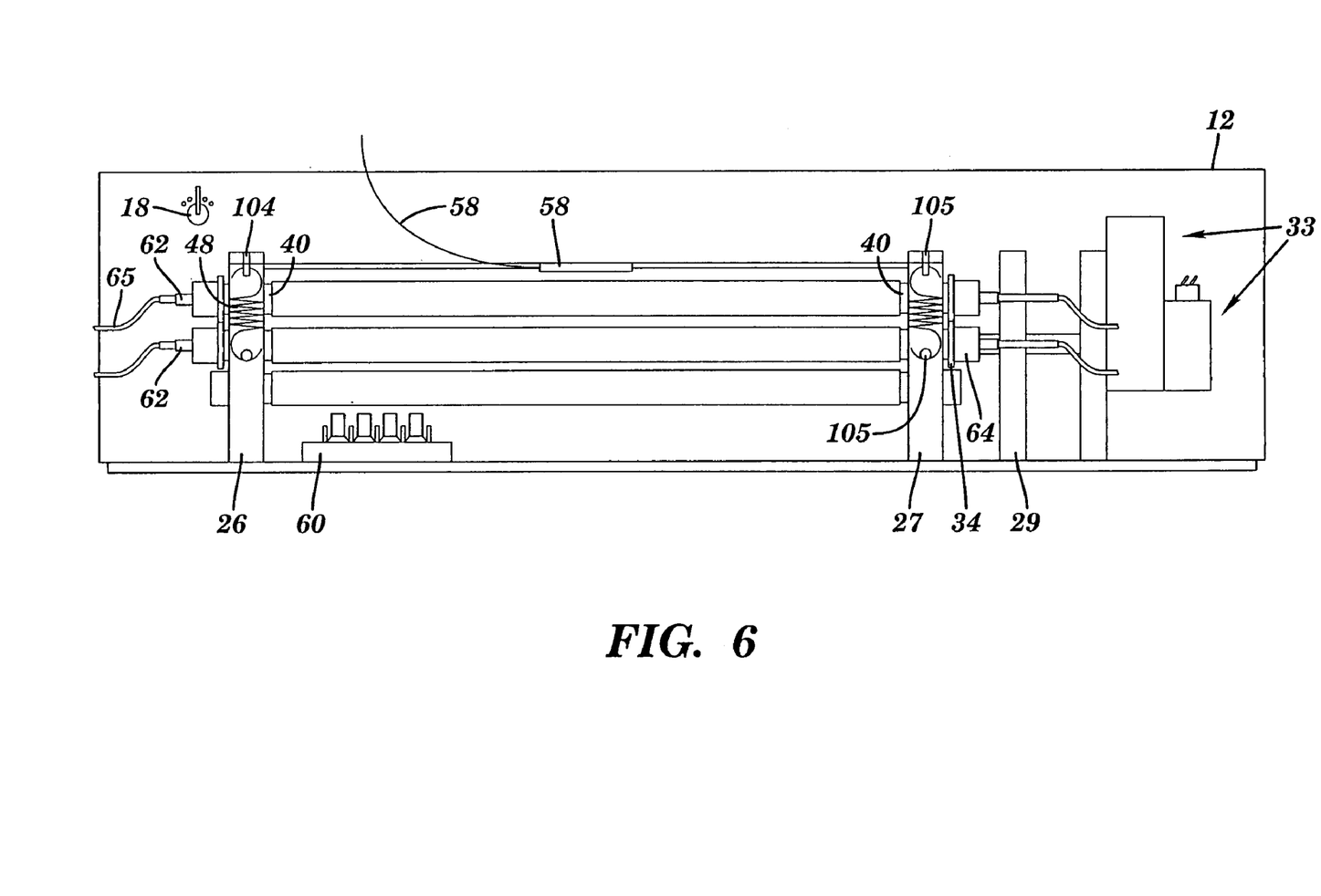
FIG. 6 is a front elevation view of the device of FIG. 5, shown in more detail than that shown in FIG. 3.
Figure 7:
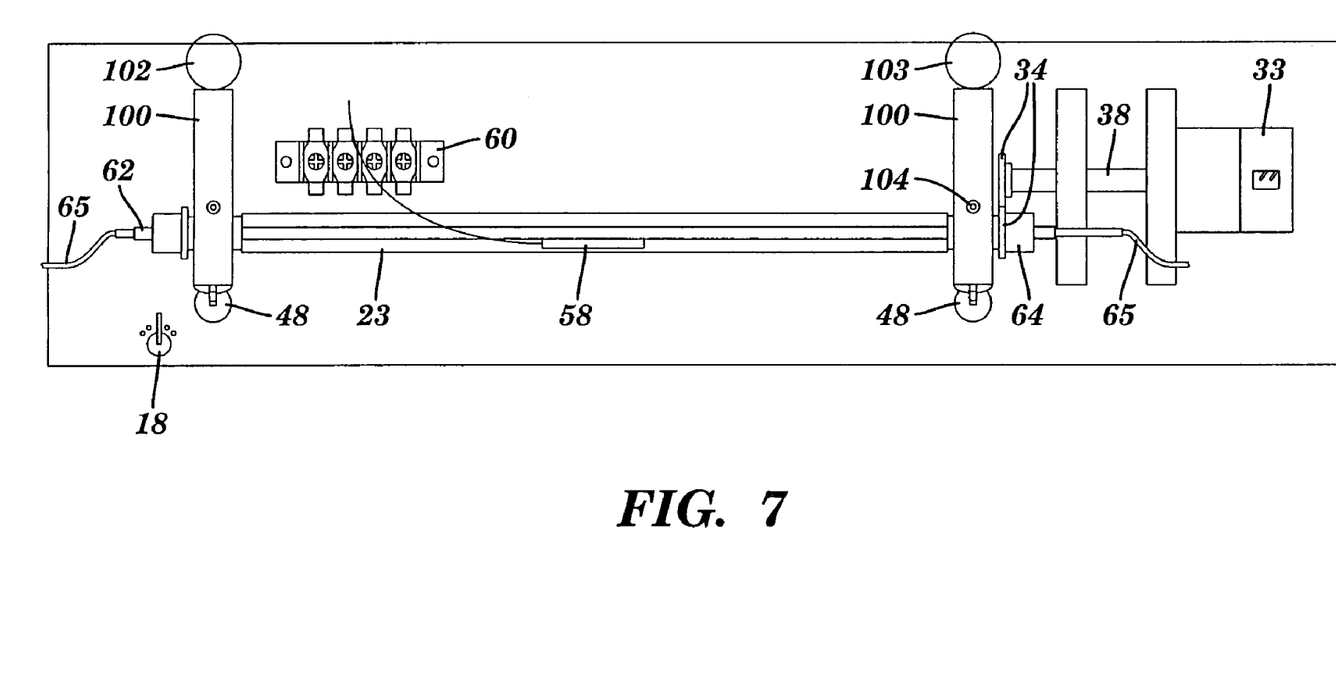
FIG. 7 is a top plan view of the device of FIGS. 5 and 6.

Referring now to FIGS. 5–7, an exemplary embodiment of a laminator in accordance with the present invention is described having more detail. FIGS. 5 and 6 are substantially similar views corresponding to FIGS. 2 and 3, respectively, but in more detail. FIG. 7 is a top plan view of the laminator illustrated in FIGS. 5 and 6. As a packet or pouch to be laminated is passed through the opening 13 over platform 14 it will initially pass between a pair of rolls 23 and 24 which are driven at a constant speed and each having a concentric heating element disposed therein. A thermostat 58 is in contact with one of the rolls 23 and 24 here shown as upper roll 23 to control and monitor the heat applied thereto. The reference numeral 59 designates an electrical lead to the thermostat 58. Electrical lead 59 is operably electrically connected to a terminal block assembly 60. Other thermostatic means may be provided for controlling the heating elements.

In an exemplary embodiment, thermostat 58 is an infrared (IR) sensor in thermal communication with the upper roll 23. IR sensor 58 is configured to determine a laminating temperature of the upper roll. By sensing the temperature of upper roll 23, a temperature of the middle roll 24 is known, as potentiometer 18 controls both heaters 62 disposed with respect to rolls 23 and 24. Each heater 62 is mounted inside a respective roll 23 and 24 using a roll heater center and stabilizing clamp 64 disposed on either end thereof. A roll heater lead 65 extends from each clamp 64 for connection with terminal block assembly 60.

In an exemplary embodiment infrared sensor 58 is an IR thermometer module including a thermopile sensor configured to generate a linear output signal. More specifically, the thermopile sensor is configured to generate an output that is linear with respect to a temperature of roll 23 also reflective of a temperature of roll 24 as discussed above. For example, the module can have an analog voltage output using an IR thermometer module equipped with sensors that use a thermistor with a positive thermal coefficient (PTC) commercially available from Melexis Microelectronic Systems, Concord, N.H., model number MLX90601EZA-BAA. More specifically, the IR thermometer module generates an analog voltage output in reaction to varying an object temperature (e.g., roll 23 temperature) and an ambient temperature.

Defined at the back of the laminating machine 10 between upper housing member 12 and lower housing member 11 is an exit opening 66 aligned with entrance opening 13 whereby the material to be laminated exits between a pair of rolls 23 and 24. Likewise, defined at the front of the laminating machine 10 is an exit opening 68 aligned with entrance opening 21 whereby material to be laminated exits between a pair of rolls 24 and 25. Each of the rolls 23, 24, and 25 comprise a metallic cylinder 77 with a rubber or plastic sleeve 78 thereabout as exemplified on roll 23 and 25, respectively, in FIGS. 8 and 9.

Figure 8:
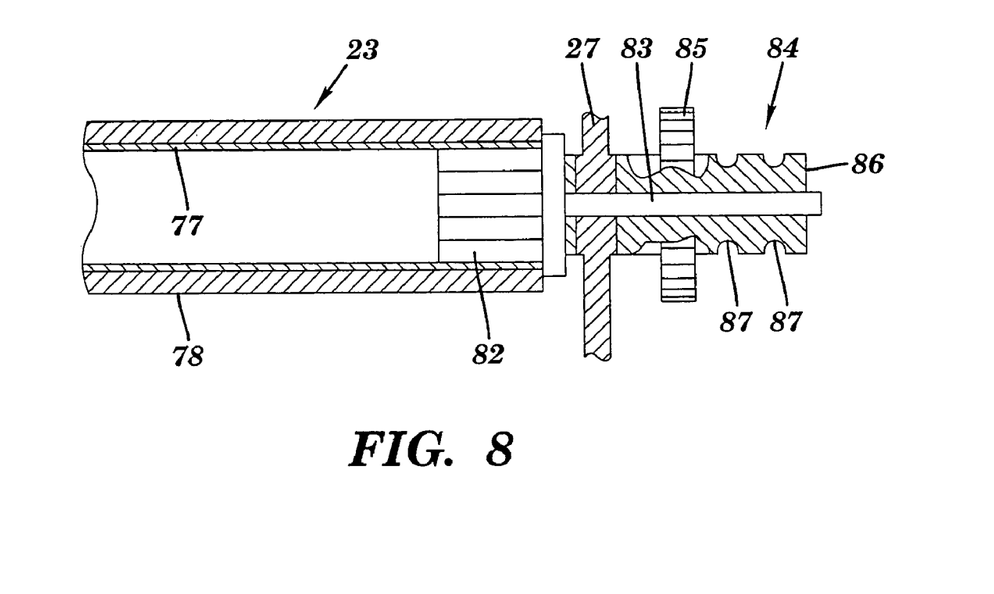
FIG. 8 is a fragmentary view, partially in section, of an end of one of the rolls of FIG. 3 exemplifying the drive coupling of the rolls.

Reference is now made to FIG. 8 which illustrates roll 23 in part, with concentric heater 62 removed for sake of clarity, at the driven end. Roll 23 as previously described comprises cylinder 77 with sleeve 78 thereon. A journal member has an insert portion 82 frictionally received within cylinder 77 or key coupled thereto and a journal shaft portion 83 extending through a bearing opening in end wall 89.

Shaft 83 has thereon a power transmission member 84 which includes a gear 85 and a pulley 86. The gear and pulley may be integral and made of a plastic material such as nylon. Pulley 86 has at least one annular groove 87 defined therein which accept pulley belts which may be O-rings 40.

Figure 9:
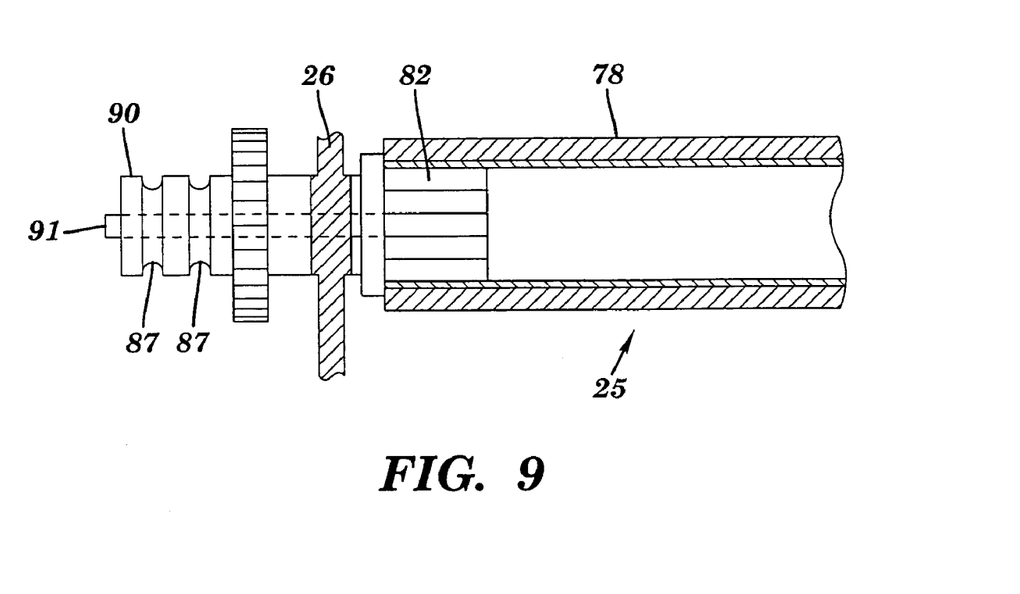
FIG. 9 is a fragmentary view, partially in section, of the other end of the roll of FIG. 8.

Another power transmission member 90 is shown in FIG. 9 which is utilized at the non-geared ends of rolls 23 and 25. A member 90 omits a gear but is provided with at least one belt groove 87. Member 90 is attached to roll 25 and provides journal shaft 91 for roll 23.

FIG. 8 is representative of the right hand end of roll 23, as viewed in FIG. 3. FIG. 9 is representative of the left hand end of roll 25 as viewed in FIG. 3.

Reference is now made again to FIGS. 2 and 5–7 which show at least end support 27. End supports 26 and 27 are identical and only one need be shown as in FIGS. 2 and 5. Each end plate 26, 27 has a pivoted bearing arm 100 defining bearings (not shown) to receive the journal shaft 83 of roll 23. The bearing arms 100 define bearing arm pivots 102 and 103 providing a pivot point about which an opposite or distal end of bearing arms 100 pivot limited by an adjusting screw 104. Adjusting screw 104 limits a range of pivoting of corresponding bearing arms 100 and thus translation of roll 23 away from roll 24, while still maintaining geared communication therebetween.

Reference is now made to FIG. 5 taken in conjunction with FIGS. 6 and 7. FIG. 7 exemplifies the roll drive system when relatively thin material M1 and thicker material M2 is being laminated. Although simultaneous lamination of M1 and M2 can be accomplished, it is contemplated that lamination of either M1 and M2 is done separately from the other. The gears 34 on the end of rolls 23 and 24 are meshing (FIG. 7). The rolls 23, 24, and 25 are shown behind the gears (omitted) in FIG. 5. Gear 34 on roll 24 drives gear 85 (FIG. 8) on roll 23. A pulley coaxially fixed with gear 85 on roll 23 drives a corresponding pulley on roll 25 which in turn drives roll 25 in the same direction as roll 23. Thus all of the rolls are driven in synchronization to pass material between either or both the platens within rolls 23 and 24.

A pulley belt 40 extends about the pulleys 87 of rolls 23 and 25 in one of the grooves 87 (FIGS. 8 and 9). A pulley belt 40 connects the pulleys 43 and 45 of rolls 23 and 25, respectively.

A spring 48 mounted opposite bearing arm pivots 102, 103 bear on each bearing arm 100. Two springs 48 are shown in FIGS. 6 and 7 biasing roll 23 toward roll 24. Springs 48 together with spring seats 105 are shown in detail in FIGS. 5 and 6. The springs 48 act to maintain rolls 23 and 24 in contact with material M1.

It will be apparent that the gears on rolls 23 and 24 are always in mesh in order to maintain synchronization between rolls 23 and 24 and like wise with rolls 24 and 25 where roll 24 drives roll 23, which in turn drives roll 25. Therefore it is necessary to have rolls 23, 24 and 25 in synchronized speed of rotation.

Reference is now made to FIG. 5 taken in conjunction with FIGS. 6 and 7 which exemplify the operation of machine 10 when a thick material M2 is passed through the machine which will cause the gears of rolls 24 and 25 to separate, while mesh between gears of rolls 23 and 24 is maintained in order for roll 23 to drive roll 25 via belts 40 on opposing pulleys of respective rolls 23 and 25.

As the thick material M2 goes between the roll pairs, roll 24 is rotatably fixed with respect to end supports 26 and 27. Roll 25 is translatable toward base 11 to accept material M2 while gears of each pair of rolls 23 and 24 are maintained in contact for geared communication therebetween.

Belts 40 provide an upward bias on lower roll 25 while springs 48 provide a downward bias on upper roll 23 to maintain and ensure that the coaxially disposed gear of upper roll 23 is in driving contact with a corresponding gear coaxially disposed with second roll 24 that is driven by motor 33.

The middle gear 24 is always gear connected through motor drive gear 36 and thus rotates at a predetermined speed. The pulley drive system between upper and lower rolls, 23 and 25, respectively, ensures that the lower roll 25 will rotate at the same speed in synchronization with driven roll 24.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A laminator for laminating a document in a laminating pouch and/or a substrate comprising:
    a first roll, said first roll being heated along a length thereof;
    a third roll;
    a second roll, said second roll being heated along a length thereof, said second roll intermediate said first and third rolls;
a first nip defining a first distance between said first and second rolls, said first nip configured to laminate a document between first and second sheets of laminating film;
    a second nip defining a second distance between said second and third rolls, said second nip configured to laminate said document intermediate a film and a substrate;
    a first drive means for driving one of said first and second rolls;
    a second drive means for connecting said first and second rolls, wherein said first and third rolls are operably connected to rotate in a same direction;
    a first means defining a first path on one side of said first, second, and third rolls, said first means for inserting a laminating pouch between said first and second rolls;
    a second means defining a second path on an opposite side of said one side of said first, second, and third rolls, said second means for inserting said substrate between said second and third rolls from said opposite side of said first, second, and third rolls, and a biasing means biasing said first and third rolls toward said second roll.

2. The laminator of claim 1, wherein said first drive means includes a drive motor configured to drive one of said first and second rolls.

3. The laminator of claim 2, wherein said drive motor includes a drive gear operably geared to a roll gear coaxially disposed on one of said first and second rolls.

4. The laminator of claim 3, wherein said roll gear includes a second gear coaxially disposed with said second roll on one end.

5. The laminator of claim 4, wherein said first roll includes a first gear axially disposed on one end therewith, said first gear in geared communication with said second gear.

6. The laminator of claim 1, wherein said first and second sheets of laminating film includes one of a laminating pouch and a folded laminating pouch.

7. The laminator of claim 1, wherein said substrate is a foam board.

8. The laminator of claim 7, wherein said foam board is about 0.25 inches thick.

9. The laminator of claim 1, wherein said first roll drives said third roll via a pulley belt.

10. The laminator of claim 1, wherein said second roll is utilized in one of two forms of lamination, said two forms of lamination include cooperation wit said first roll for pouch lamination and include cooperation with said third roll for board laminating.

11. The laminator of claim 1, wherein said first and second rolls each have a concentric stationary heater extending therethrough.

12. The laminator of claim 1, wherein the pouch is fed through said first and second rolls on said one side and a laminating substrate is fed through said second and thirds rolls from said opposite side of said one side.

13. The laminator of claim 1 further including an infrared (IR) sensor in thermal communication with one of said first and second rolls, said IR sensor configured to determine a laminating temperature of one of said first and second rolls.

14. The laminator of claim 13, wherein said infrared sensor is an IR thermometer module, said IR thermometer module including a thermopile sensor configured to generate a linear output signal.

15. The laminator of claim 14, wherein said thermopile sensor is configured to generate an output that is linear with respect to a temperature of one of said first and second rolls.

16. The laminator of claim 14, wherein said IR thermometer module generates an analog voltage output, said IR module reacting when at least one of an object temperature and an ambient temperature is varied.

17. The laminator of claim 1, wherein said first distance is smaller than said second distance.

18. The laminator of claim 1, wherein said biasing means includes a spring disposed at either end of said first roll, each spring biasing a corresponding bearing member in communication with said first roll toward said second roll.

19. The laminator of claim 18, wherein each bearing member includes an adjustment member configured to limit said first distance to maintain geared communication between said first and second rolls.

20. The laminator of claim 1, wherein said biasing means is configured to maintain synchronization of rotation of said first, second, and third rolls independent of a thickness of material passing between a pair of said first, second, and third rolls, said biasing means configured to bias said first and third rolls toward said second roll.

21. A laminator for laminating a document in a laminating pouch and/or a substrate comprising:
    a first roll, said first roll being heated along a length thereof;
    a third roll;

a second roll, said second roll being heated along a length thereof, said second roll intermediate said first and third rolls;

a first nip defining a first distance between said first and second rolls, said first nip configured to laminate a document between first and second sheets of laminating film;

a second nip defining a second distance between said second and third rolls, said second nip configured to laminate said document intermediate a film and a substrate;

a first drive means for driving one of said first and second rolls;

a second drive means for connecting said first and second rolls, wherein said first and third rolls are operably connected to rotate in a same direction;

a first means defining a first path on one side of said first, second, and third rolls, said first means for inserting a laminating pouch between said first and second rolls;

a second means defining a second path on an opposite side of said one side of said first, second, and third rolls, said second means for inserting said substrate between said second and third rolls from said opposite side of said first, second, and third rolls; and a biasing means biases said first and third rolls toward said second roll, said biasing means including a biasing power transmission means between said first and third rolls configured to bias said third roll toward said second roll while synchronizing rotation thereof.

22. A laminating machine of the type which laminates documents between sheets of plastic or on a substrate comprising:

a housing;

a first roll having a first end shaft defining ends thereof, said first roll being heated along a length thereof;

a third roll;

a second roll, said second roll being heated along a length thereof, said second roll intermediate said first and third rolls, said first, second, and third rolls within said housing having end shafts, said first and second rolls arranged for pouch laminating while said second and third rolls arranged for board laminating;

spaced apart end supports in a housing rotatably supporting said end shafts, said first and third rolls mounted in said end supports to move away from said second roll to accommodate material of variable thickness;

a first drive means operably connected to one of said first and second rolls to drive said first and second rolls in synchronizing rotation;

a second drive means operably connecting said first and third rolls to rotate in a same direction and to bias said third roll toward said second roll while permitting said third roll to move away from said second roll to an extent dependant on the thickness of material passing between said second and third rolls;

a biasing means biases said first and third rolls toward said second roll, said biasing means including a biasing power transmission means between said first and third rolls configured to bias said third roll toward said second roll while synchronizing rotation thereof.

* * * * *